United States Patent [19]
Iiboshi

[11] Patent Number: 5,418,724
[45] Date of Patent: May 23, 1995

[54] ANTISKID CONTROL APPARATUS

[75] Inventor: Jiro Iiboshi, Himeji, Japan

[73] Assignee: Mitsubishi Denki Kabushiki Kaisha, Tokyo, Japan

[21] Appl. No.: 944,985

[22] Filed: Sep. 15, 1992

[30] Foreign Application Priority Data

Sep. 25, 1991 [JP] Japan .................. 3-245439

[51] Int. Cl.$^6$ .................. B60T 8/58
[52] U.S. Cl. .................. 364/426.02; 303/100; 303/103
[58] Field of Search ........ 364/426.02, 426.03; 180/197; 303/95, 100, 103, 105

[56] References Cited

U.S. PATENT DOCUMENTS

| | | | |
|---|---|---|---|
| 4,665,490 | 5/1987 | Masaki et al. | 364/426.02 |
| 4,672,547 | 6/1987 | Masaki et al. | 364/426.02 |
| 4,807,133 | 2/1989 | Shimanuki et al. | 364/426.02 |
| 4,883,325 | 11/1989 | Shimanuki et al. | 364/426.02 |
| 5,072,393 | 12/1991 | Mori et al. | 364/426.02 |
| 5,092,662 | 3/1992 | Okubo | 364/426.02 |
| 5,117,934 | 6/1992 | Tsuyama et al. | 364/426.02 |
| 5,148,368 | 9/1992 | Okubo | 364/426.02 |
| 5,280,432 | 1/1994 | Kuwana et al. | 364/426.02 |

FOREIGN PATENT DOCUMENTS

| | | |
|---|---|---|
| 3421253 | 12/1984 | Germany . |
| 3715103 | 12/1987 | Germany . |
| 4025045 | 2/1991 | Germany . |
| 261566 | 11/1987 | Japan . |

*Primary Examiner*—Gary Chin
*Attorney, Agent, or Firm*—Sughrue, Mion, Zinn, Macpeak & Seas

[57] ABSTRACT

A slip factor and a wheel acceleration are respectively calculated on the basis of a wheel speed; an increase/decrease pressure quantity for the brake pressure is calculated in an increase/decrease pressure quantity calculating means on the basis of the slip factor and the wheel acceleration; the wheel acceleration is subjected to waveform-shaping with a predetermined hysteresis characteristic to form pulses; the period of the pulses are calculated by a period calculating means; the increase/decrease pressure quantity calculated by the increase/decrease pressure quantity calculating means is corrected by an increase/decrease pressure quantity correcting means in response to the period; the output of the increase/decrease pressure quantity correcting means is received by a bad road judging means in which judgment is made as to whether the road is bad or not, and a correction quantity of the increase/decrease pressure quantity correcting means is changed by a correction changing means.

2 Claims, 6 Drawing Sheets

ANTISKID CONTROL APPARATUS

BACKGROUND OF THE INVENTION

1. Field of the Invention

The present invention relates to an antiskid control apparatus capable of preventing an inadequate operation such as wheel locking even when vibrations of a vehicle are taken place due to a bad road when the vehicle is braked.

2. Discussion of Background

FIG. 9 is a diagram showing an example of operation of a conventional antiskid control apparatus to prevent reduction in a brake pressure at a bad road at an early stage, disclosed in, for instance, Japanese Unexamined Patent Publication No. 261566/1987.

In the conventional antiskid control apparatus, as shown in FIG. 9, a provisional wheel speed 102 which traces an actual wheel speed 101 with a difference of speed which is a predetermined speed $\Delta V_0$ lower than the wheel speed 101, is used. The provisional wheel speed 102 is so designed as to decrease with a constant gradient of speed reduction $\theta$ from the time when the deceleration of the wheel speed 101 has reached a predetermined value. When the provisional wheel speed 102 becomes equal to the actual wheel speed 101, the reduction of a brake pressure 103 is started.

Then, a time T from the time of starting braking or a high peak point of wheel speed to the next high peak point of wheel speed, a time t from the low peak point of wheel speed during the time T to the high peak point, and a difference of speed $\Delta V$ between the low peak point to the high peak point are measured.

When the time T and the time t are respectively shorter than a predetermined time $T_0$ and a time $t_0$, and the difference of speed $\Delta V$ is larger than a predetermined difference of speed $\Delta V_0$, the predetermined difference of speed $\Delta V_0$ determined for the provision wheel speed 102 is changed to a predetermined difference speed $\Delta V_1$ which is larger than the difference of speed $\Delta V_0$. Thus, the initiation of reducing the brake pressure 103 at an early stage can be prevented, and elongation of the braking distance is prevented.

In FIG. 9, a symbol P101 indicates the brake pressure in the first cycle and P102 indicates the brake pressure in the second cycle or subsequent cycles.

In the conventional antiskid control apparatus having the operations described above, when the brake is operated while the vehicle runs on a road having a low frictional coefficient, there is a possibility of vibrations in wheel speed due to a torsion in the driving system. When such vibrations in the wheel speed take place, a judgment of bad road is made and a correction to a bad road is effected to thereby prohibit the pressure reduction of the brake pressure; this may cause a danger of wheel locking.

Further, when an automobile runs on a bad road and vibrations take place in the wheel speed, the bad road has to be correctly detected in order to effect correction. Otherwise, the brake pressure is excessively reduced, whereby the brake distance is increased.

SUMMARY OF THE INVENTION

It is an object of the present invention to provide an antiskid control apparatus capable of correctly detecting a bad road and bringing the brake pressure into an optimum pressure to a road surface.

The foregoing and other objects of the present invention have been attained by providing an antiskid control apparatus which comprises:

a wheel speed detecting means for detecting a wheel speed, a slip factor calculating means for calculating a slip factor on the basis of the wheel speed detected by the wheel speed detecting means, a wheel acceleration calculating means for calculating a wheel acceleration by differentiating the wheel speed, an increase/decrease pressure quantity calculating means for calculating an increase or decrease a pressure quantity in braking pressure on the basis of the slip factor and the wheel acceleration, a brake pressure controlling means for increasing or decreasing a brake pressure on the basis of the increase or decrease of the pressure quantity, a waveform shaping means for waveform-shaping the wheel acceleration into pulses by using a predetermined hysteresis characteristic, a period calculating means for calculating the period of the pulses, an increase/decrease pressure quantity correcting means for correcting the increase or decrease of the pressure quantity calculated by the increase/decrease pressure quantity calculating means in response to the period, a bad road judging means for making judgment based on the output of the increase/decrease pressure quantity correcting means as to whether the road is bad or not, and a correction changing means for generating a signal of changing a correction to the increase/decrease pressure quantity correcting means when the bad road judging means judges the road being bad.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
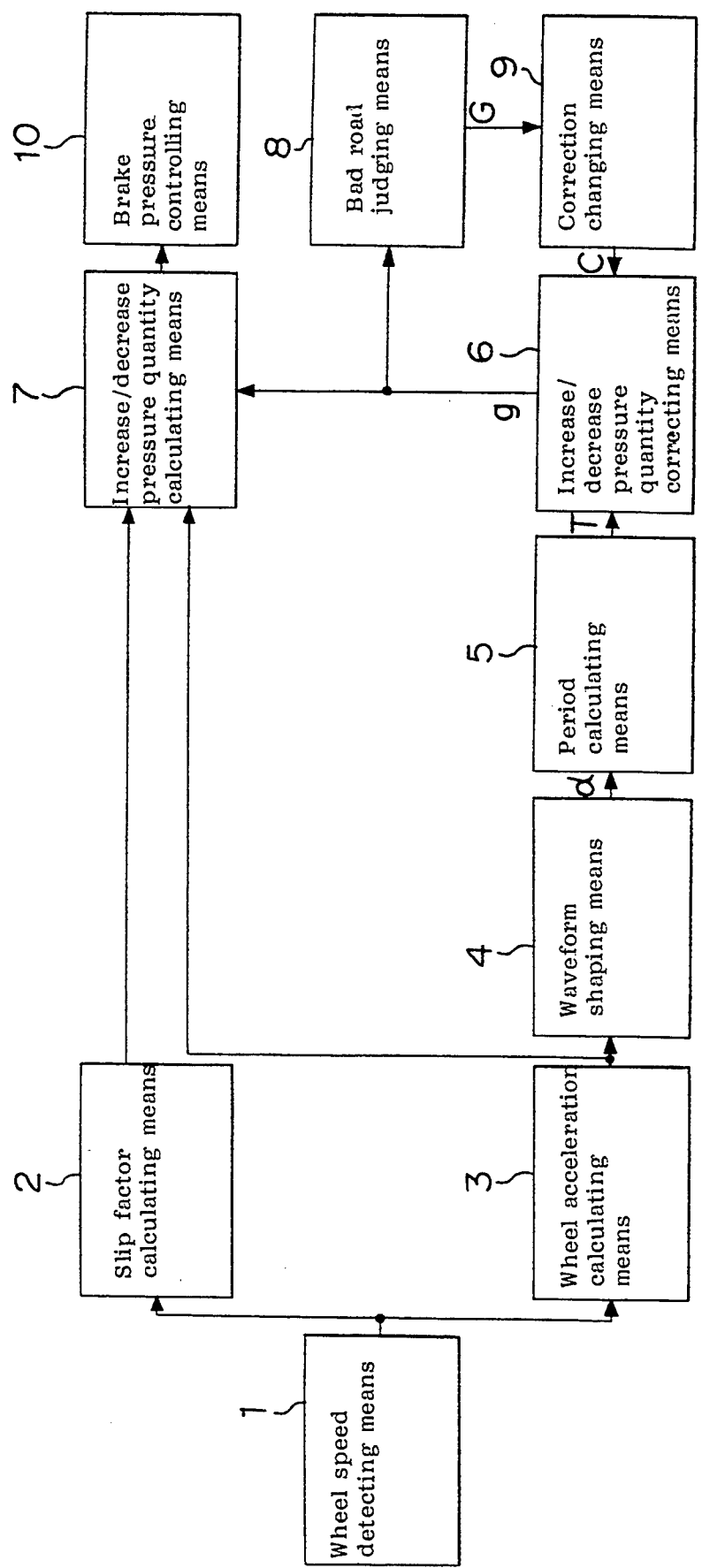
FIG. 1 is a block diagram showing an embodiment of the antiskid control apparatus according to the present invention.

Referring to the drawings wherein the same numerals designate the same or corresponding parts, and more particularly to FIG. 1, there is shown a block diagram showing the construction of an embodiment of the antiskid control apparatus of the present invention. In FIG. 1, reference numeral 1 designates a wheel speed detecting means to detect a wheel speed. An output from the detecting means is outputted to a slip factor calculating means 2 and a wheel acceleration calculating means 3.

The slip factor calculating means 2 calculates a slip factor on the basis of the wheel speed detected by the wheel speed detecting means 1, and supplies an output signal as a result of calculation to an increase/decrease pressure quantity calculating means 7. The wheel acceleration calculating means 3 receives a signal indicating the wheel speed detected by the wheel speed detecting means 1 to calculate a wheel acceleration by differentiating the wheel speed. The wheel acceleration thus obtained is outputted to the increase/decrease pressure quantity calculating means 7 and the waveform shaping means 4.

The waveform shaping means 4 is adapted to arrange the wheel acceleration calculated by the wheel acceleration calculating means 3 to form pulses with a predetermined hysteresis (log response) characteristic and to output the pulses subjected to waveform-shaping to the period calculating means 5.

The period calculating means 5 is adapted to calculate the period of the pulses inputted from the waveform shaping means 4 and to output the period of pulses to the increase/decrease pressure quantity correcting means 6. The increase/decrease pressure quantity correcting means 6 is to produce a correcting signal for correcting an increase/decrease pressure quantity from the period of the pulses and to output the correcting signal to the increase/decrease pressure quantity calculating means 7 and the bad road judging means 8.

The increase/decrease pressure quantity calculating means 7 calculates an increase/decrease pressure quantity for the brake pressure based on the slip factor and the wheel acceleration; corrects the increase/decrease pressure quantity by receiving the correcting signal from the increase/decrease pressure quantity correcting means 6, and outputs a signal depending on the increase/decrease pressure quantity to the brake pressure controlling means 10.

The bad road judging means 8 is to receive the output of the increase/decrease pressure quantity correcting means 6 and to judge whether the road is bad or not, and as a result of a judgment of a bad road, it supplies a signal to the correction changing means 9 so that a signal demanding the change of a correction of the increase/decrease pressure quantity is outputted from the correction changing means 9 to the increase/decrease pressure quantity correcting means 6.

The operation of the embodiment shown in FIG. 1 will now be described.

The wheel speed detecting means 1 detects a wheel speed. The slip factor calculating means 2 calculates a slip factor on the basis of the wheel speed detected. The wheel acceleration calculating means 3 calculates a wheel acceleration on the basis of the wheel speed detected.

The wheel acceleration calculated by the wheel acceleration calculating means 3 is received by the waveform shaping means 4 in which the wheel acceleration is subjected to waveform-shaping with a predetermined hysteresis characteristic to obtain pulses $\alpha$, which are outputted to the period calculating means 5.

The period calculating means 5 calculates the period T of the pulses $\alpha$ and it outputs the period T to the increase/decrease pressure quantity correcting means 6. The increase/decrease pressure quantity correcting means 6 outputs a correcting signal g in response to the period T to the increase/decrease pressure quantity calculating means 7 in order to correct the increase/decrease pressure quantity for the brake pressure in response to the period T.

The correcting signal g is also inputted to the bad road judging means 8 so that the judging means 8 judges whether the road is bad or not. When the judging means 8 makes a judgment that the road is bad, it generates a signal G indicating bad road to the correction changing means 9.

The correction changing means 9 outputs a correction changing signal C to the increase/decrease pressure quantity correcting means 6 so that the optimum correction is made for the increase/decrease pressure quantity.

On the other hand, the increase/decrease pressure quantity calculating means 7 calculates an increase/decrease pressure quantity by receiving the slip factor, the wheel acceleration and the correcting signal g of the increase/decrease pressure quantity correcting means 6, whereby a pressure increase signal or a pressure decrease signal is outputted to the brake pressure controlling means 10. Thus, the brake pressure controlling means 10 is actuated to increase or decrease the brake pressure.

Detailed description will be made below as to a concrete example of the antiskid control apparatus of the invention.

Figure 2:
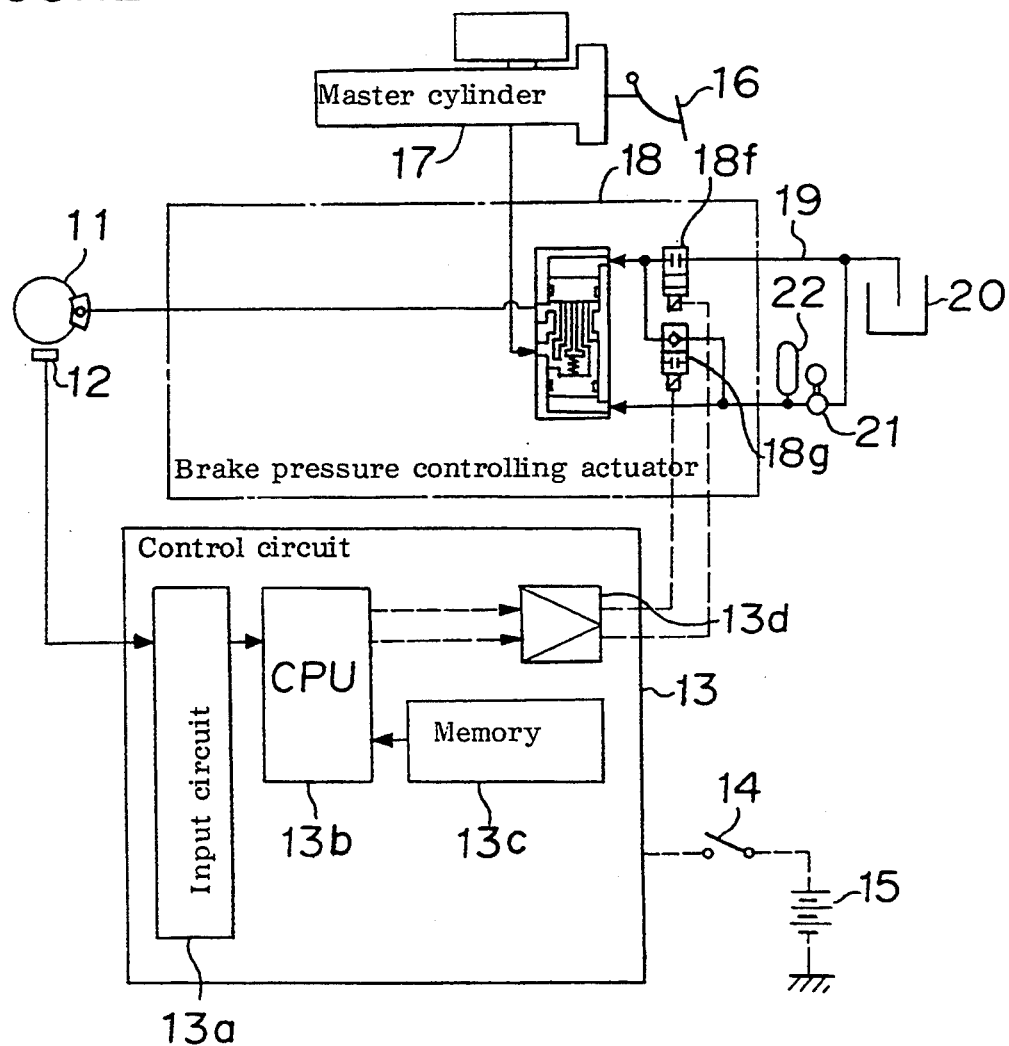
FIG. 2 is a circuit diagram showing an embodiment of an important part of the antiskid control apparatus of the present invention.

FIG. 2 is a circuit diagram showing the construction. For simplifying the explanation, FIG. 2 shows only a single wheel. Reference numeral 11 designates a wheel brake and numeral 12 designates a wheel speed sensor disposed on a wheel.

The output of the wheel speed sensor 12 is inputted to a CPU (central processing unit) 13b through an input circuit 13a in a control circuit 13. The control circuit 13 comprises the CPU 13b as the primary component, the input circuit 13a, a memory 13c and an output circuit 13d. The control circuit 13 is connected to the positive pole of a car battery 15 through a power source switch 14. The negative pole of the car battery 15 is grounded.

A control signal is outputted from the output circuit 13d of the control circuit 13 to a pressure reducing solenoid 18f and a holding solenoid 18g in the brake pressure controlling actuator 18 respectively. The detail of the brake pressure controlling actuator 18 is shown in an enlarged view of FIG. 3.

Figure 3:
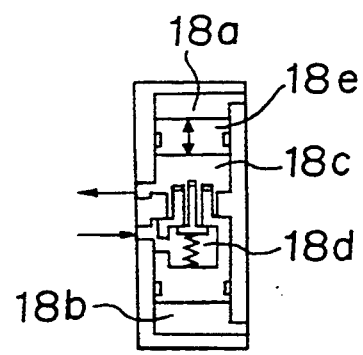
FIG. 3 is an enlarged view of a brake pressure controlling actuator used for the antiskid control apparatus shown in FIG. 2.

As shown in FIG. 3, the brake pressure controlling actuator 18 includes chambers 18a, 18b and 18c. A piston 18e is disposed in a vertically movable manner between the chambers 18a, 18c. The vertical movements of the piston 18e cause a pressure change to fluid such as a brake oil in a wheel brake 11. A cut valve 18d is arranged between the chambers 18c, 18b, and fluid is introduced from a master cylinder 17 to the cut valve 18d.

Referring to FIG. 2, when a brake pedal 16 is operated, a pressure is applied to the master cylinder 17, whereby the fluid is introduced from the master cylinder 17 to the cut valve 18d of the brake pressure controlling actuator 18.

The pressure reducing solenoid 18f is connected to a reservoir 20 through a pipe 19. Further, an accumulator 22 which is driven by a pump motor 21 is connected to the reservoir 20.

In the following, the operation of the structure shown in FIG. 2 will be described.

The control circuit 13 is supplied with power from the car battery 15 through the power source switch 14. A signal from the wheel speed sensor 12 is inputted to the input circuit 13a. Then, the CPU 13b comprising a microcomputer is actuated in accordance with an instruction program stored in the memory 13c, whereby a result of calculation is outputted to the pressure reducing solenoid 18f and the holding solenoid 18g of the brake pressure controlling actuator 18 through the output circuit 13d. A braking force produced by operating the brake pedal 16 reaches the wheel brake 11 via the master cylinder 17 and the brake pressure controlling actuator 18.

. The operation of the antiskid control apparatus under the condition of antiskid control will be explained referring to FIG. 3 showing the brake pressure controlling actuator in detail.

Usually the chambers 18a, 18b are maintained at the same pressure, and the cut valve 18d is open by a pushing force by the piston 18e.

When a pressure reducing signal is outputted through the output circuit 13d of the control circuit 13, both the pressure reducing solenoid 18f and the holding solenoid 18g are actuated to release the pressure of the chamber 18a to the reservoir 20 through the pipe 19. Accordingly, the piston 18e is moved upwardly in FIG. 3, whereby the cut valve 18d is closed to interrupt the pressure of the master cylinder and the pressure of the wheel. As a result, the volume of the chamber 18c is increased to reduce the wheel pressure. Thus, the brake force is reduced.

When the control circuit 13 outputs a holding signal, the pressure reducing solenoid 18f is brought to a non-operation state and only the holding solenoid 18g is actuated. As a result, the piston 18e is stopped so that the brake force is maintained.

When the control circuit 13 outputs a pressure increase signal, both the pressure reducing solenoid 18f and the holding solenoid 18g are in non-operation state. Accordingly, the pump motor 21 and the accumulator 22 which maintain a high pressure state act as power sources, whereby the chamber 18a is pressurized to thereby move the piston 18e downwardly in FIG. 3. As a result, the volume of the chamber 18c is reduced to thereby increase the brake pressure.

Thus, by repeating pressure decreasing, maintaining and pressure increasing in accordance with instructions from the control circuit 13, wheel-locking can be prevented while the brake force can be adjusted.

Figure 4:
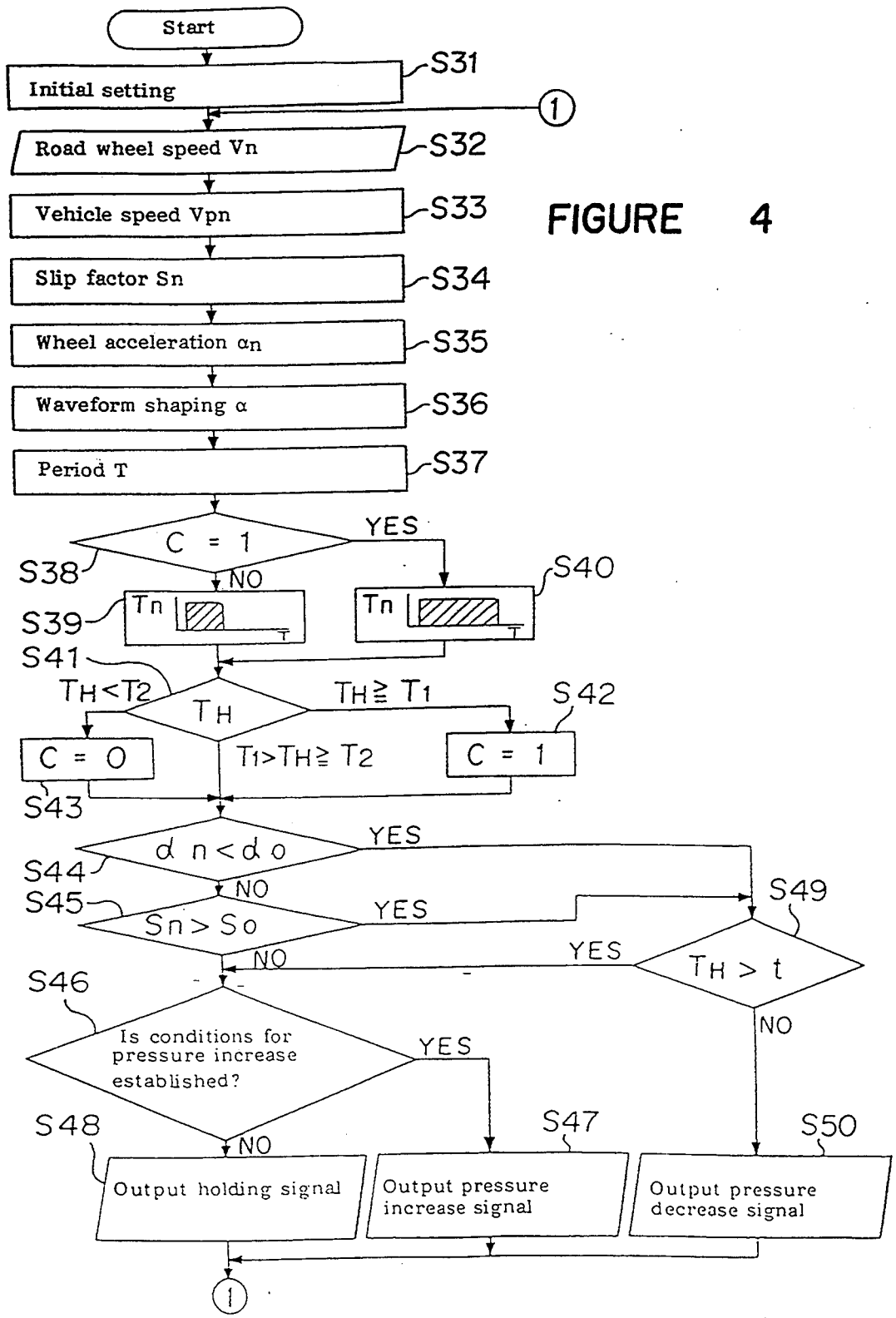
FIG. 4 is a flowchart showing the operations of a CPU provided in a control circuit for the antiskid control apparatus shown in FIG. 2.

The operation of the CPU 13b comprising a microcomputer in the control circuit 13 will be described with reference to a flowchart in FIG. 4.

At Step S31, initial setting to each RAM, output value and so on is performed.

At Step S32, the wheel speed $V_n$ is calculated. As a method of the calculation, there is, for instance, a period calculating method wherein a pulse signal having a frequency which is in proportion to a revolution speed of a wheel is produced from the wheel speed sensor 12, and the pulse signal is inputted into the control circuit 13 through the input circuit 13a (FIG. 2), and the wheel speed $V_n$ is calculated by using the following equation:

$$V_n = K(P_{n-1})/(t_{Pn} - t_{P1}) \qquad (1)$$

where $P_n$ is the number of pulses in a predetermined period, $t_{P1}$ is the time at which the first pulse is inputted after starting measurement, $t_{Pn}$ is the time at which the final pulse is inputted, and K is a constant.

At Step S33, the vehicle speed $V_{Pn}$ is calculated. In the calculation, a vehicle speed $V_{Pn-1}$ which is obtained just before a control period performed by the microcomputer is used, and the vehicle speed is decreased with a predetermined gradient to obtain a reduced value. Then, the higher speed calculated from the vehicle speed $V_{Pn-1}$ and the wheel speed $V_n$ is selected.

At Step S34, the slip factor $S_n$ is calculated. In the calculation, the following equation is used.

$$S_n = (V_{Pn} - V_n)/V_{Pn} \qquad (2)$$

At Step S35, the wheel acceleration $\alpha_n$ is calculated. The wheel acceleration $\alpha_n$ is obtained by using the equation:

$$\alpha_n = L(V_n - V_{n-1})/TL \qquad (3)$$

where TL is a control period by the microcomputer, $V_{n-1}$ is a wheel speed before 1 control period, $V_n$ is the present wheel speed, and L is a constant. $\alpha_n > 0$ means an acceleration and $\alpha_n < 0$ means a deceleration.

At Step S36, the wheel acceleration $\alpha_n$ is subjected to waveform-shaping with a predetermined hysteresis characteristic to produce pulses $\alpha$. The waveform-shaping method is conducted using a transfer function according to which when the wheel acceleration $\alpha_n$ becomes a predetermined positive acceleration reference value $\alpha_1$ or higher, the pulse signal $\alpha$ is ON, and thereafter, when the wheel acceleration becomes a predetermined negative acceleration reference value $\alpha_2$ or lower, the pulse signal $\alpha$ is made OFF.

At Step S37, the period T of the pulses $\alpha$ is calculated.

At Step S38, determination is made as to whether or not the correction changing signal C is provided. If C=0, Step S39 is taken. At Step S39, an increase/decrease pressure quantity correcting time TH is obtained by a predetermined function which provides the maximum value at the time corresponding to a varying frequency 7-15 Hz on a bad road and makes smaller as time becomes longer, on the basis of the period T. Then, sequential step is moved to Step S41.

At Step S38, when C=1, Step S40 is taken. At Step S40, from the period T, an increase/decrease pressure quantity correcting time TH is obtained by a predetermined function which has a value of time corresponding to a frequency lower than the function in Step S39. Then, sequential step is moved to Step S41.

At Step S41, when the increase/decrease pressure quantity correction time TH is a predetermined value $T_1$ or higher, sequential step is moved to Step S42 at which the correction changing signal is changed to C=1, and Step S44 is taken.

On the other hand, at Step S41, when the increase/decrease pressure quantity correcting time TH is smaller than a predetermined value $T_2$ which is smaller than $T_1$, sequential step is moved to Step S43. Then, the correction changing signal is changed to C=0 at Step S43, and Step S44 is taken.

At Step S41, when the increase/decrease pressure quantity correcting time TH is smaller than the predetermined value $T_1$, and is equal to or larger than $T_2$, i.e. $T_1 > TH \geq T_2$, Step S44 is taken.

At Step S44, when $\alpha_n \geq \alpha_0$ in comparison of the wheel acceleration $\alpha_n$ with a predetermined wheel acceleration reference value $\alpha_0$, sequential step is moved to S45. On the other hand, when $\alpha_n < \alpha_0$, sequential step is moved to Step S49.

At Step S45, the slip factor $S_n$ is compared with a predetermined slip factor reference value $S_0$. When $S_n > S_0$, sequential step is moved from the YES side of Step S45 to Step S49. On the other hand, when $S_n < S_0$ at Step S45, sequential step is moved from the NO side of Step S45 to Step S46. Namely, when $\alpha_n > \alpha_0$ and $S_n < S_0$ at Steps S44 and S45, and further when the condition for pressure increase are established at Step S46, a signal of increasing pressure is outputted at Step S47. On the other hand, when the condition for pressure increase is not established at Step S46, a holding signal is outputted at Step S48.

Further, when $\alpha_n < \alpha_0$ at Step S44 or $S_n > S_0$ at Step S45, the increase/decrease pressure quantity correcting time TH is compared with a pressure reducing time t at Step S49. When TH $\leq$ t, a pressure reducing signal is outputted at Step S50. On the other hand, when TH $>$ t, the pressure increase signal or the holding signal is outputted at Step S46, S47 or S48. The pressure reducing time t is added at Step S44 and Step S45 whenever conditions of pressure decrease are established. Namely, when the period T is short, the increase/decrease pressure quantity correcting time TH corresponding to the period T assumes a large value, and accordingly, the correction changing signal assumes C=1. When the period T is temporarily long, the increase/decrease pressure correcting time TH assumes a large value. Thus, excessive pressure reduction is prevented by prohibiting pressure reduction during only the increase/decrease pressure correcting time TH whereby the optimum brake pressure to the road surface is obtainable.

Explanation will be made with reference to FIGS. 5, 6, 7 and 8 as to a case that the above-mentioned operations are applied to a vehicle.

Figure 5:
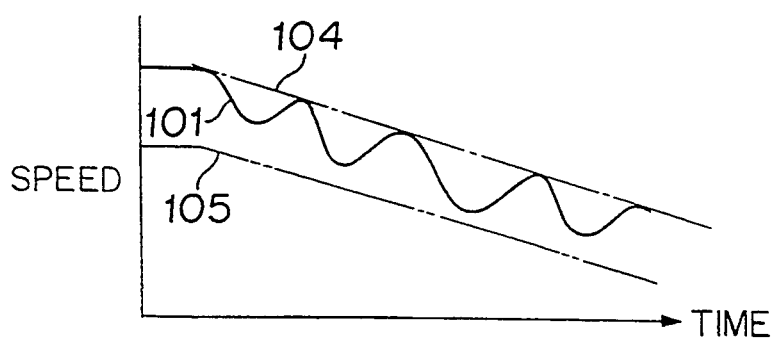
FIG. 5 is a time vs speed characteristic diagram with respect to a bad road for explaining the operations of the antiskid control apparatus of the present invention.
Figure 6:
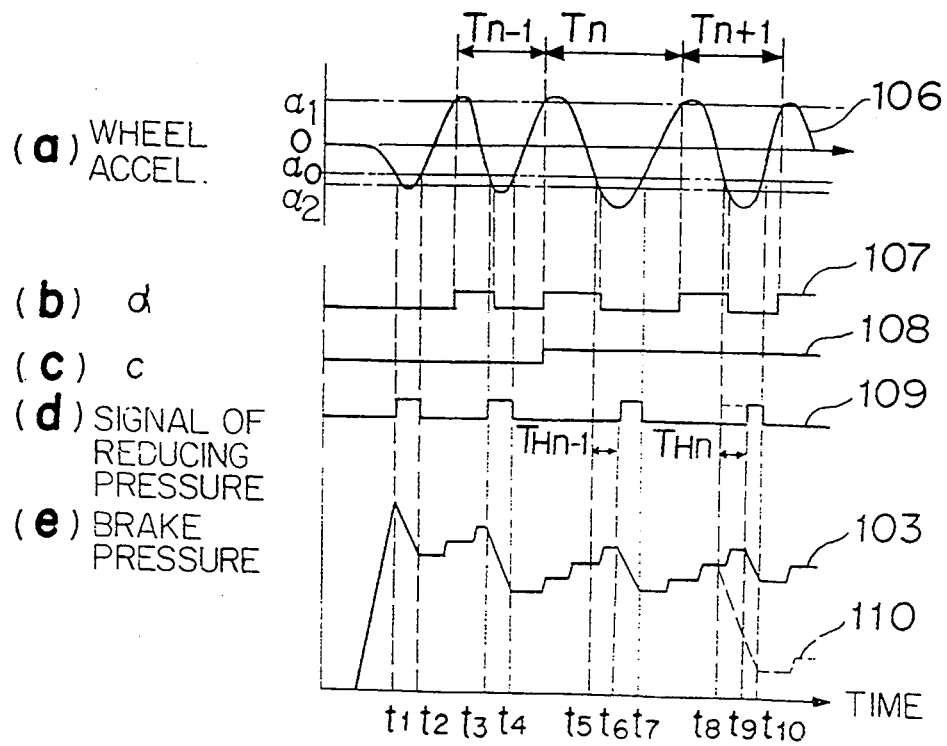
FIG. 6 is waveforms on a bad road for explaining the operations of the antiskid control apparatus of the present invention.

Assuming that the wheel speed varies as shown in characteristic line 101 in FIG. 5 on a bad road. Then, the vehicle speed is calculated as shown in a characteristic line 104, and the vehicle speed including a slip factor $S_0$% is calculated as indicated by a characteristic line 105. As a result, the wheel acceleration is calculated as indicated by a characteristic line 106 as in FIG. 6a.

When the wheel acceleration characteristic line 106 shown in FIG. 6a is provided, the waveform-shaped pulses are transformed into a waveform 107 shown in FIG. 6b; the correction changing signal C is transformed into a waveform 108 as in FIG. 6c, and the pressure reducing signal is outputted having a waveform 109 as shown in FIG. 6d. By the pressure reducing signal having the waveform 109, the brake pressure is changed to have a waveform 103 as shown in FIG. 6e.

In FIG. 6a, the wheel acceleration does not exceed the wheel acceleration reference value $\alpha_0$ in periods of time $t_1$–$t_2$, $t_3$–$t_4$, $t_5$–$t_7$ and $t_8$–$t_{10}$. If pressure reducing operations are conducted in the above-mentioned periods of time excluding the increase/decrease pressure quantity correcting time $TH_{n-1}$ (i.e. a period of time $t_5$–$t_6$) which is obtained from a period $T_{n-1}$, because the period $T_{n-1}$ of the waveform-shaped pulses $\alpha$ is short, the brake pressure is changed as shown by the broken line 110 in FIG. 6e.

In this embodiment, however, since the increase/decrease pressure quantity correcting time $TH_{n-1}$ is large, the correction changing signal becomes C=1. Accordingly, even when the period $T_n$ of the waveform-shaped pulses $\alpha$ is temporarily long, the pressure reducing operations are prohibited during the increase/decrease pressure quantity correcting time $TH_n$ (i.e. a period of time $t_8$–$t_9$), whereby excessive pressure reduction under a bad road condition is prevented, and the brake pressure is controlled to have a pressure (indicated by the waveform 103) higher than the case of the broken line 110 in FIG. 6e.

Figure 7:
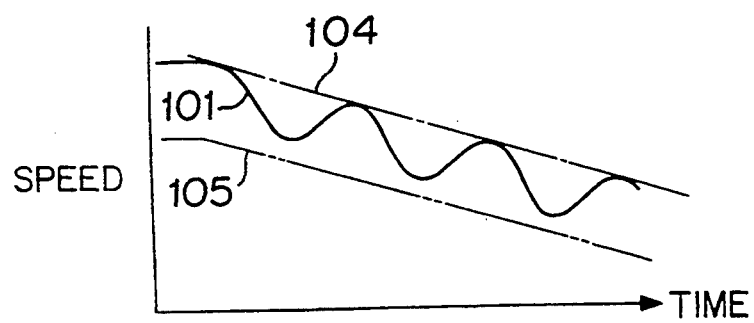
FIG. 7 is a time vs speed characteristic diagram on a road having a low frictional coefficient for explaining the operations of the antiskid control apparatus of the present invention.
Figure 8:
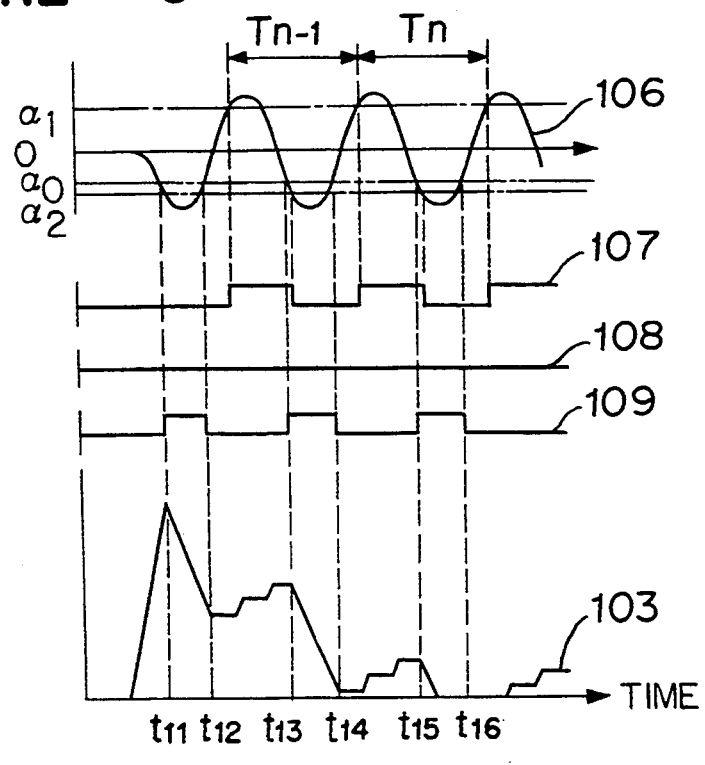
FIG. 8 shows the waveforms while traversing a road having a low frictional coefficient for explaining the operation of the antiskid control apparatus of the present invention.
Figure 9:
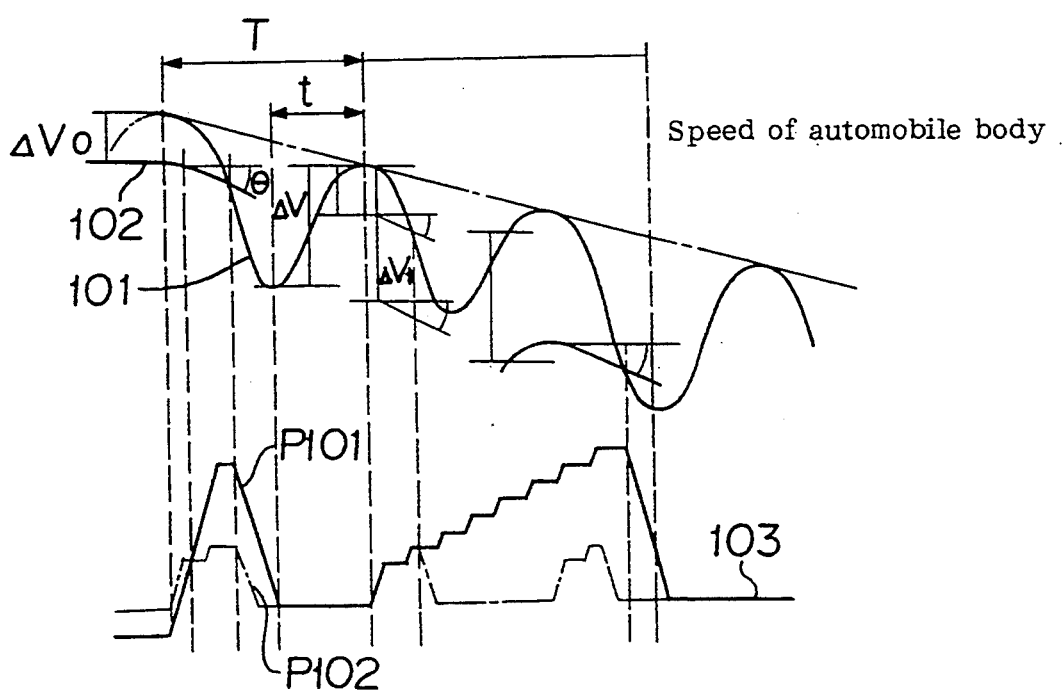
FIG. 9 is a diagram showing the operations of a conventional antiskid control apparatus.

Assuming that there occur vibrations due to a cause such as a distortion in the driving system of a vehicle when the brake pedal is operated on a road having a low frictional coefficient, whereby the wheel speed is changed as indicated by a characteristic line 101 in FIG. 7. Then, the wheel acceleration as indicated in FIG. 8a is calculated to have a characteristic line 106. From the characteristic line 106 of the wheel acceleration, the waveform-shaped pulses $\alpha$ shown in FIG. 8b is changed into a waveform 107; the correction changing signal C in FIG. 8c is changed into a waveform 108, and the pressure reducing signal in FIG. 8d is changed into a waveform 109. From the waveform 109 of the pressure reducing signal, the brake pressure shown in FIG. 8e is changed into a waveform 103.

In this embodiment, since the periods $T_{n-1}$ and $T_n$ of the waveform-shaped pulses $\alpha$ are long, each of the increase/decrease pressure quantity correcting times obtained by the periods $T_{n-1}$ and $T_n$ take small value. Accordingly, pressure reduction is not prohibited, and the correction changing signal is not changed to C=1, whereby pressure reducing operation are conducted normally in periods of time $t_{11}$–$t_{12}$, $t_{13}$–$t_{14}$ and $t_{15}$–$t_{16}$. Accordingly, the brake pressure is controlled to have the optimum pressure to a road having a low frictional coefficient.

In the above-mentioned first embodiment, the increase/decrease pressure quantity correcting time TH is used to prohibit pressure reduction as means for changing pressure by the increase/decrease pressure quantity changing means. However, the same effect can be obtained by changing the wheel acceleration reference value $\alpha_0$ or the slip factor reference value $s_0$, which is provided as a second embodiment.

Further, in the above-mentioned embodiments, the bad road judging means 8 makes a judgment of a bad road by using the increase/decrease pressure quantity correcting time TH. However, the same effect can be obtained by using the period T of the waveform-shaped pulses $\alpha$ of the wheel acceleration $\alpha_n$.

Thus, in accordance with the present invention, a judgment of a bad road is made by using the period of the waveform-shaped pulses of a wheel acceleration or an increase/decrease pressure quantity correcting signal, whereby a correction of increase/decrease pressure quantity is changed. Accordingly, there is no possibility that vibrations in a wheel speed due to a distortion of the driving system are taken erroneously as a bad road when the period of pulses is temporarily long, and precise detection of a bad road is possible. Accordingly, an excessive reduction of brake pressure on a bad road can be prevented, and the brake pressure can be controlled to provide the optimum pressure to a road surface.

What is claimed is:

1. An antiskid control apparatus which comprises:
   a wheel speed detecting means for detecting a wheel speed,
   a slip factor calculating means for calculating a slip factor on the basis of the wheel speed detected by the wheel speed detecting means,
   a wheel acceleration calculating means for calculating a wheel acceleration by differentiating the wheel speed,
   an increase/decrease pressure quantity calculating means for calculating an increase or decrease of a pressure quantity in braking pressure on the basis of the slip factor and the wheel acceleration,
   a brake pressure controlling means for increasing or decreasing a brake pressure on the basis of the increase or decrease of the pressure quantity,
   waveform shaping means for waveform-shaping the wheel acceleration into pulses by using a predetermined transfer function,
   a period calculating means for calculating a period of the pulses,
   an increase/decrease pressure quantity correcting means generating a correction signal for correcting the increase or decrease in the pressure quantity in response to the period,
   a bad road judging means for making judgment based on the output of the increase/decrease pressure quantity correcting means as to whether the road is rough, and
   a correction changing means responsive to said correction signal of a prior period for generating a modification signal to modify said correction signal.

2. The antiskid control apparatus according to claim 1, wherein the bad road judging means makes a judgment based on the output of the period calculating means as to whether the road is rough.

* * * * *